(12) United States Patent
Fujita

(10) Patent No.: US 6,606,507 B1
(45) Date of Patent: Aug. 12, 2003

(54) CORDLESS TELEPHONE SYSTEM AND METHOD HAVING A PLURALITY OF DISPLAY STATES AND MODES

(75) Inventor: Toshihiro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/500,964

(22) Filed: Feb. 15, 2000

(30) Foreign Application Priority Data

Feb. 17, 1999 (JP) .......................... 11-038027

(51) Int. Cl.⁷ .................. H04Q 7/20; H04B 1/38; H04M 1/64; H04M 3/42
(52) U.S. Cl. .............. 455/566; 455/414; 455/415; 455/561; 455/567; 379/88.21; 379/207.14; 379/207.15
(58) Field of Search .............. 455/414, 415, 455/426, 461, 462, 463, 465, 551, 561, 566, 567, 575, 550, 425; 379/88.21, 201.02, 201.04, 201.08, 142.12, 207.14, 207.15, 142.01, 142.02, 142.1, 142.13

(56) References Cited

U.S. PATENT DOCUMENTS 5,825,859 A * 10/1998 Wu et al. .................. 379/131
5,953,656 A * 9/1999 Bertocci ..................... 455/412
6,134,308 A * 10/2000 Fallon et al. ............... 379/142
6,298,122 B1 * 10/2001 Horne ....................... 379/3.09
6,463,278 B2 * 10/2002 Kraft et al. ................ 455/418

* cited by examiner

Primary Examiner—Edward F. Urban
Assistant Examiner—Meless Zewdu
(74) Attorney, Agent, or Firm—Jay H. Maioli (57) ABSTRACT

In cordless telephone system where any of a base unit and portable units did not respond to an incoming call, LEDs of the base unit and the portable units are respectively set in a blinking state. In the case where the base unit responded to the incoming call, the LEDs of the base unit and the portable unit which is set to a common mode are respectively switched off state, and the LED of the portable unit which is set to a separate mode is switched off. In the case where the portable unit responded to the incoming call, the LEDs of the base unit, the portable unit having responded to the incoming call, and the portable unit which is set to the common mode are respectively switched off and the LED of the portable unit which is set to the separate mode is switched on.

4 Claims, 5 Drawing Sheets

FIG. 7A — NO RESPONSE

|  | BASE UNIT | PORTABLE UNIT | |
|---|---|---|---|
|  |  | COMMON MODE | SEPARATE MODE |
| DATA | UNCONFIRMED | UNCONFIRMED | UNCONFIRMED |
| LED | BLINKING | BLINKING | BLINKING |

FIG. 7B — RESPONSE BY BASE UNIT

|  | BASE UNIT | PORTABLE UNIT | |
|---|---|---|---|
|  |  | COMMON MODE | SEPARATE MODE |
| DATA | CONFIRMED | CONFIRMED | NON-RESPONDED |
| LED | SWITCHING OFF | SWITCHING OFF | CONTINUOUS LIGHTING |

FIG. 7C — RESPONSE BY PORTABLE UNIT

|  | BASE UNIT | PORTABLE UNIT RESPONDED | ANOTHER PORTABLE UNIT | |
|---|---|---|---|---|
|  |  |  | COMMON MODE | SEPARATE MODE |
| DATA | CONFIRMED | CONFIRMED | CONFIRMED | NON-RESPONDED |
| LED | SWITCHING OFF | SWITCHING OFF | SWITCHING OFF | CONTINUOUS LIGHTING |

FIG. 7D — CONFIRMED BY BASE UNIT

|  | BASE UNIT | PORTABLE UNIT | |
|---|---|---|---|
|  |  | COMMON MODE | SEPARATE MODE |
| DATA | CONFIRMED | CONFIRMED | NON-RESPONDED |
| LED | SWITCHING OFF | SWITCHING OFF | CONTINUOUS LIGHTING |

FIG. 7E — CONFIRMED BY PORTABLE UNIT

|  | BASE UNIT | PORTABLE UNIT CONFIRMED | ANOTHER PORTABLE UNIT | |
|---|---|---|---|---|
|  |  |  | COMMON MODE | SEPARATE MODE |
| DATA | CONFIRMED | CONFIRMED | CONFIRMED | NON-RESPONDED |
| LED | SWITCHING OFF | SWITCHING OFF | SWITCHING OFF | CONTINUOUS LIGHTING |

CORDLESS TELEPHONE SYSTEM AND METHOD HAVING A PLURALITY OF DISPLAY STATES AND MODES

BACKGROUND OF THE INVENTION

1. Field of the Invention

The present invention relates to a cordless telephone.

2. Description of the Related Art

As one of services made by a telephone company, there is a notification service of a calling telephone number, a so-called number display service (hereinafter referred to as a "ND service"). This is such that when an incoming call is effected, data of a telephone number of a calling party giving the incoming call are transmitted to the telephone of the incoming call destination.

Thus, if a telephone corresponding to the ND service is prepared, at the incoming call, it is possible to display the telephone number of the counter party giving the incoming call. Alternatively, if a data table including a telephone number and a counter party's name is prepared, at the incoming call, the name of the counter party giving the incoming call can be known.

When the ND service is used, if the data of the counter party's telephone number are stored in a memory, even if, for example, there is an incoming call while a person is away from home, when the person comes home, it is possible to know the occurrence of the incoming call and the counter party's telephone number. In the case of a cordless telephone, if the counter party's telephone number is displayed on not only a base unit but also a portable unit, it is not necessary to take the trouble to go to the place of the base unit to see the telephone number, which is convenient.

However, in the case of doing so, when the person comes home and sees the counter party's telephone number, the subsequent processing becomes a problem. That is, if such a structure is adopted that when the displayed telephone number has been confirmed, only the telephone number displayed on the telephone (base unit or portable unit) used for the confirmation is erased, with respect to the other telephones, it is necessary to go to the places of the respective telephones to erase the display.

Alternatively, the system can be configured to erase the number display on all telephones in the system when the displayed telephone number is confirmed. In a system with such a configuration, however, the displays can not be erased until the person to whom the call was addressed notes the telephone number.

Thus, the case where only the telephone number displayed on the telephone that is used by the person to perform the confirmation operation is erased, as well as the case where the telephone number displayed on all of the telephones is erased, are both inconvenient.

SUMMARY OF THE INVENTION

An object of the present invention is to solve the foregoing problems.

Therefore, according to the present invention, a cordless telephone comprises:

a base unit and portable units each including a display element for displaying a telephone number of a calling party; and control means for controlling the base unit and the portable units, wherein the control means carries out following operations:

in a case where any of the base unit and the portable units did not respond to an incoming call, display states of the display element of the base unit and the display elements of the portable units are respectively set to a first display state;

in a case where the base unit responded to the incoming call, display states of the display element of the base unit and the display element of the portable unit which is set to a first mode among the portable units are respectively set to a second display state, and a display state of the display element of the portable unit which is set to a second mode among the portable units is set to a third display state; and in a case where the portable unit responded to the incoming call, display states of the display element of the base unit, the display element of the portable unit having responded to the incoming call among the portable units, and the display element of the portable unit which is set to the first mode among the portable units, are respectively set to the second display state, and a display state of the display element of the portable unit which is set to the second mode among the portable units is set to the third display state.

Thus, in accordance with the modes to which the portable units are set, the display elements of the portable units are notified or not notified that an incoming call has occurred.

DETAILED DESCRIPTION OF THE PREFERRED EMBODIMENTS

Figure 1:
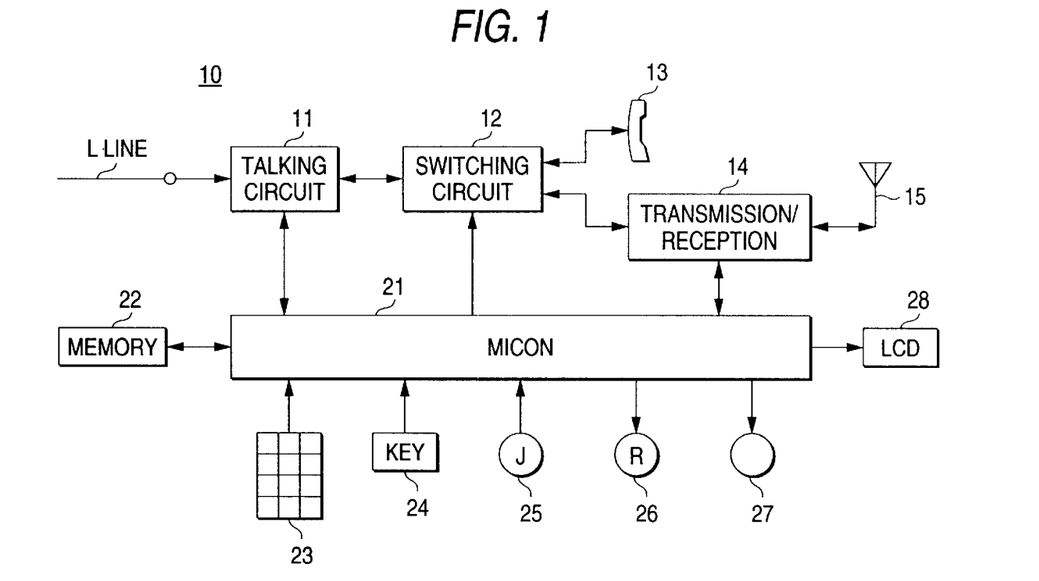
FIG. 1 is a system view showing a part of an embodiment of the invention.
Figure 2:
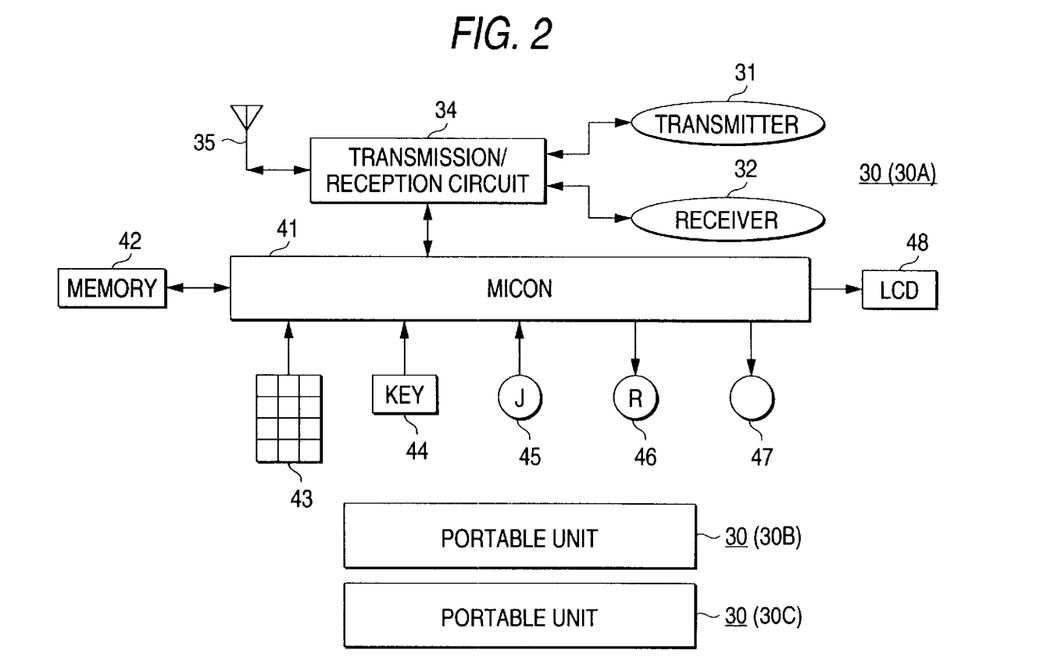
FIG. 2 is a system view showing a remaining part the embodiment of the invention.

In FIG. 1 and FIG. 2, reference numerals 10 and 30 respectively indicate an example of a base unit and a portable unit of a cordless telephone of this invention. In FIG. 2, as the portable unit 30, there are prepared three portable units 30A to 30C.

The base unit 10 includes a talking circuit 11, a channel switching circuit 12, a handset 13, and a transmitting/receiving circuit 14. In this case, the talking circuit 11 is connected to a telephone line L, and performs on-hook and off-hook processing, detection of incoming calls, detection of a counter party's telephone number by the ND service, formation of a dial signal (DTM signal or dial pulse) at the time of calling, and the like. The line switching circuit 12 is connected to a signal line between the talking circuit 11, and the handset 13 and the transmitting/receiving circuit 14, and connects one of the handset 13 and the transmitting/receiving circuit 14 to the line L through the talking circuit 11.

The handset 13 further includes a telephone transmitter and a telephone receiver (not shown) for talking. The transmitting/receiving circuit 14 transmits counter party's voice signals and various data transmitted through the line L to the portable units 30 through an antenna 15, and receives voice signals and various data transmitted from the portable units 30 through the antenna 15.

In addition, the base unit 10 is provided with a microcomputer 21 as a system control circuit. The talking circuit 11, the line switching circuit 12, and the transmitting/receiving circuit 14 are controlled by the microcomputer 21, and various detection signals detected by the talking circuit 11 are supplied to the microcomputer 21. Data transmitted/received by the transmitting/receiving circuit 14 to/from the portable unit 30 are also formed or processed by the microcomputer 21.

Moreover, a memory 22 is connected to the microcomputer 21. This memory 22 is, for example, a flash memory, or is a RAM backed up by a battery, although not shown. That is, the memory 22 is a nonvolatile memory, so that, even if power source is switched off, written data can be held. Various data such as abbreviated numbers are stored in this memory 22, and data of a counter party's telephone number by the ND service are stored at each incoming call.

Moreover, a dial key 23 for inputting a telephone number, a various operation key 24, and a jog dial 25 are connected to the microcomputer 21. The operation key 24 is constituted by a push switch, and the jog dial 25 is constituted by a rotary switch and a push switch.

Moreover, a ringer 26 is connected to the microcomputer 21, and an LED 27 and an LCD 28 as display elements are connected. In this case, the LED 27 is for notification of occurrence of an incoming call during person's absence, and the LCD 28 is for displaying the counter party's telephone number and the like by the ND service.

When the operation key 24 or the jog dial 25 is pressed, the base unit 10 enters a registration mode, and settable items are displayed as a menu on the LCD 28. When an objective item is selected and is determined from this menu by the operation key 24 or the jog dial 25, the content of the item is set, and the set content is stored in the memory 22.

On the other hand, the portable unit 30 includes a telephone transmitter 31, a telephone receiver 32, and a transmitting/receiving circuit 34. In this case, the transmitting/receiving circuit 34 is constituted in the same manner as the transmitting/receiving circuit 14 of the base unit 10, transmits voice signals and various data from the telephone transmitter 31 to the base unit 10 through an antenna 35, receives voice signals and various data transmitted from the base unit 10 through the antenna 35, and supplies the received voice signals to the telephone receiver 32.

The portable unit 30 includes a microcomputer 41 as a system control circuit. The transmitting/receiving circuit 34 is controlled by this microcomputer 41, and data transmitted/received by the transmitting/receiving circuit 34 to/from the base unit 10 are also formed or processed by the microcomputer 41.

Moreover, the microcomputer 41 is connected with a memory 42, a dial key 43, an operation key 44, a jog dial 45, a ringer 46, an LED 47, and an LCD 48 similar to the memory 22, the dial key 23, the operation key 24, the jog dial 25, the ringer 26, the LED 27, the LCD 28 in the base unit 10.

As stated above, each of the portable units can be set to one of the operational modes, including a separate mode and a common mode. Each portable unit classifies incoming number information and sets its display state based upon the operational mode set and based upon which telephone unit is used by the user in receiving an incoming call or in confirming the incoming number information. The display states include an off state, a blinking state, and a continuous lighting state. The display states allow the user of the telephone system to identify the status of a response to the incoming call or the status of confirmation of the incoming number information. The behavior of the telephone system under each operational mode is described below.

The base unit 10 and the portable units 30 can be made to be used as a general cordless telephone by processing of the microcomputers 21 and 41. Moreover, in the present invention, the microcomputer 21 is provided with, as part of programs processed by this, for example, a routine 100 shown in FIG. 3, a routine 300 shown in FIG. 5, and a routine 600 shown in FIG. 6. The microcomputer 41 is provided with, as part of programs processed by this, for example, a routine 200 shown in FIG. 4, a routine 400 shown in FIG. 5, and a routine 500 shown in FIG. 6.

Then, at an incoming call, and for example, at the time of confirmation of a counter party's telephone number after a person comes home, the following processing is executed. Incidentally, in the following, among the three portable units 30, for example, the portable units 30A and 30B are set to the common mode, and the portable unit 30C is set to the separate mode.

[In the case where any of the base unit 10 and the portable units 30 did not respond to an incoming call]

Figure 3:
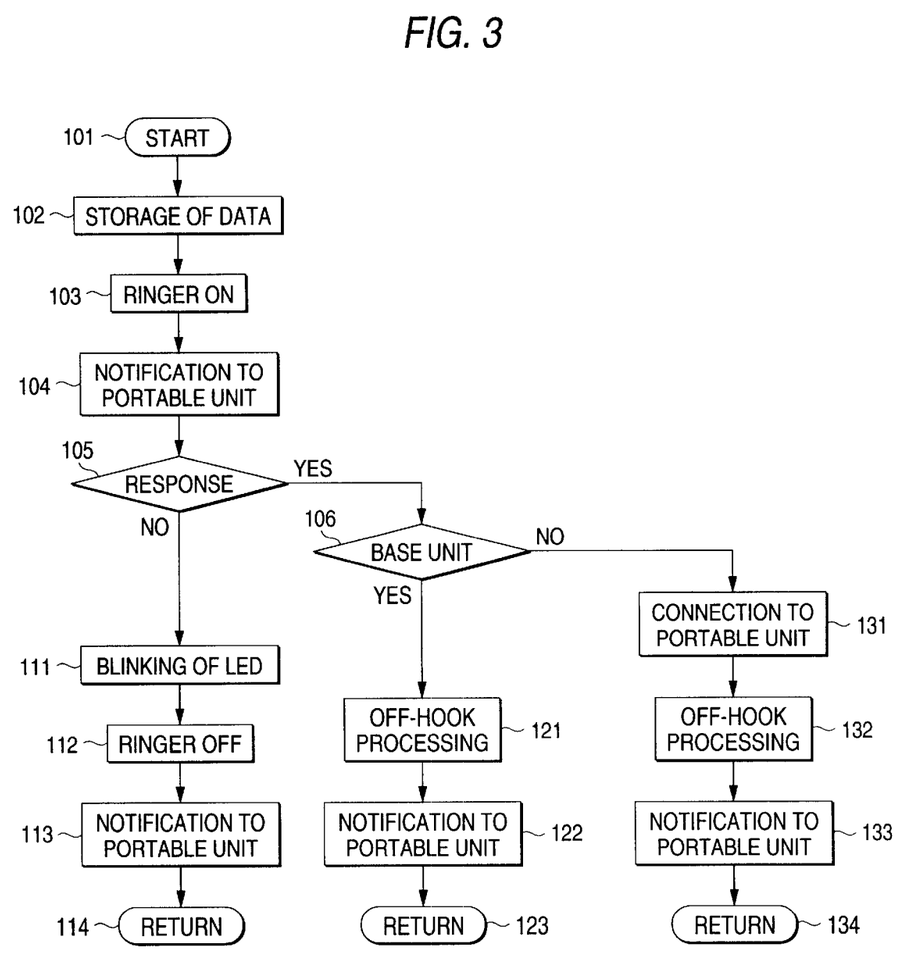
FIG. 3 is a flowchart showing the embodiment of the invention.

In the base unit 10, when an incoming call occurs, the processing of the microcomputer 21 starts from step 101 of the routine 100, and next, at step 102, data of a counter party's telephone number by the ND service transmitted through the line L are extracted through the talking circuit 11, and the data are stored in the memory 22, and the counter party's telephone number is displayed on the LCD 28 by using the data.

Subsequently, at step 103, ringing of the ringer 26 is switched on and the incoming call is informed, and next, at step 104, all the portable units 30 are notified of the incoming call, and at this time, the data of the counter party's telephone number stored in the memory 22 at step 102 are transmitted to all the portable units 30. Thereafter, at step 105, the response to the present incoming call is judged, that is, the off-hook of the base unit 10 and all the portable units 30 is checked.

Figure 7A:
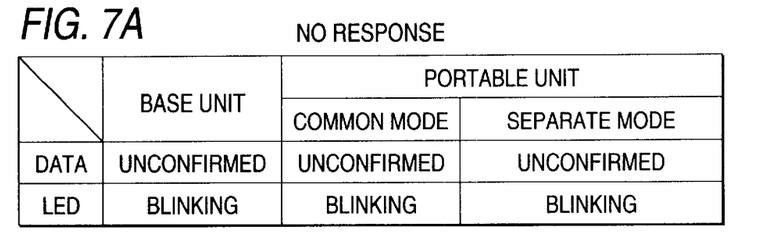
FIGS. 7A to 7E are views for explaining the invention

Since this case is a case where any of the base unit 10 and the portable units 30 did not respond to the incoming call (since this case is a case where calling from the counter party was ended while any units did not respond to the incoming call), the processing proceeds from step 105 to step 111, and at this step 111, the data of the counter party's telephone number stored in the memory 22 at step 102 are classified into unconfirmed data as shown in FIG. 7A, and the LED 27 is brought into a blinking state.

Next, at step 112, ringing of the ringer 26 is switched off, and at a subsequent step 113, all the portable units 30 are notified that calling from the counter party was ended while any units did not respond to the incoming call, and then, at step 114, this routine 100 is ended, and the base unit 10 enters a waiting state.

In this way, in the case where the base unit 10 and the portable units 30 do not respond even if the incoming call occurs, the LED 27 of the base unit 10 is brought into a blinking state.

Figure 4:
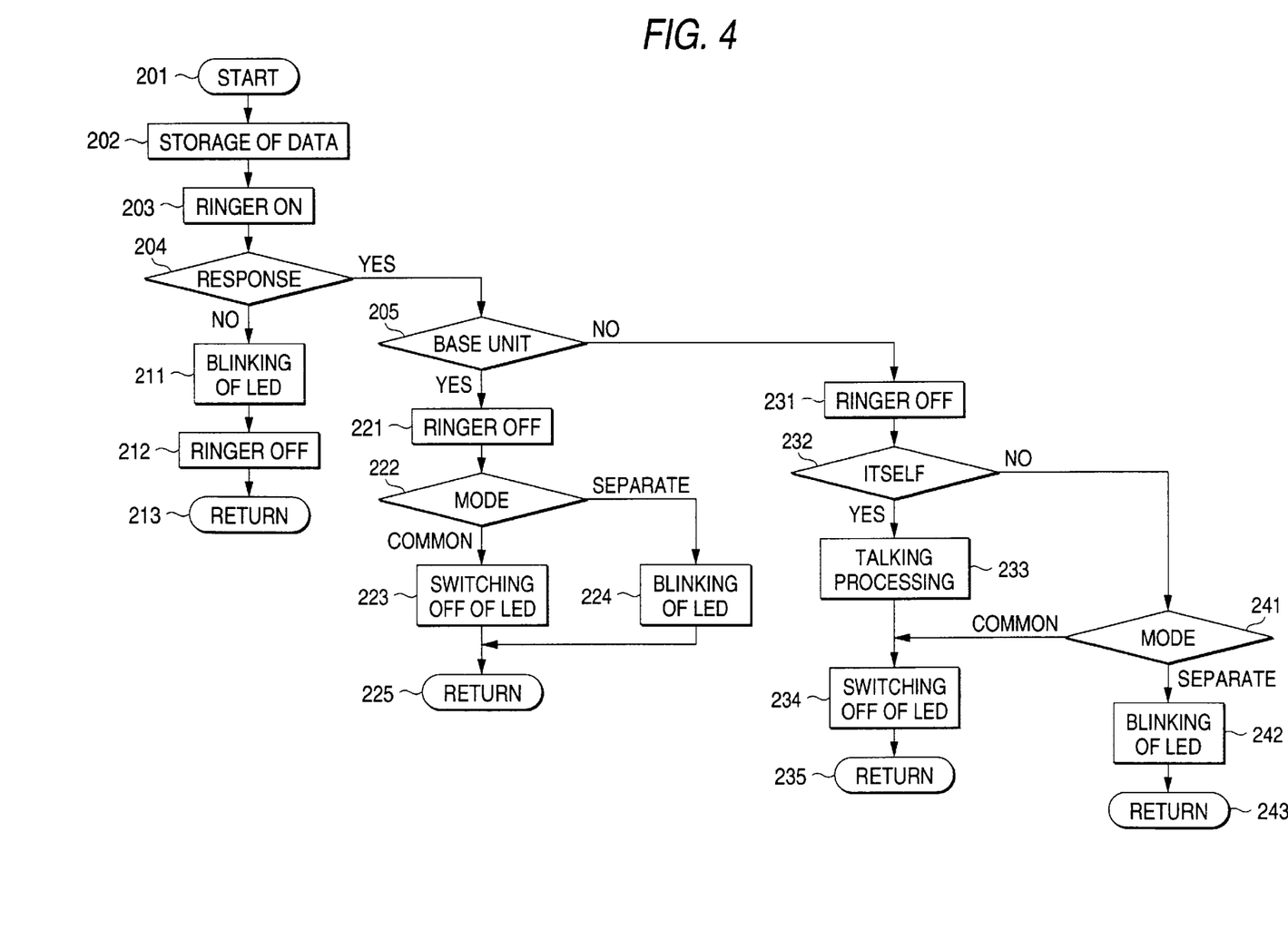
FIG. 4 is a flowchart showing the embodiment of the invention.

When the portable units 30 are notified of the incoming call at step 104, in all the portable units 30, the processing of the microcomputer 41 starts from step 201 of the routine 200, and next, the data of the counter party's telephone number transmitted from the base unit 10 at step 104 are stored in the memory 42 at step 202, and the counter party's telephone number is displayed on the LCD 48 by using the data.

Subsequently, at step 203, ringing of the ringer 46 is switched on and the incoming call is informed, and next, at step 204, responses of the base unit 10 and the units themselves are checked.

In this case, since any of them did not respond to the incoming call (at step 112, it is notified from the base unit 10 that any unit did not respond), the processing proceeds from step 204 to step 211, and at this step 211, the data of the counter party's telephone number stored in the memory 42 at step 202 are classified into unconfirmed data as shown in FIG. 7A, and the LED 47 is brought into a blinking state. Next, at step 212, ringing of the ringer 46 is switched off, and thereafter, at step 213, this routine 200 is ended, and the portable units 30 enter a waiting state.

In this way, in the case where the base unit 10 and the portable units 30 do not respond even if the incoming call occurs, as shown in FIG. 7A, the LED 27 of the base unit 10 and the LEDs 47 of all the portable units 30 become the blinking states. Thus, for example, when the LED 27 or 47 is blinking, after a person comes home, it is known that there was a call during the person's absence. When the blinking is seen and the operation of confirmation is made, the lighting states of the LEDs 27 and 47 are changed as described later.

[In the case where the base unit 10 responded to an incoming call]

When an incoming call occurs, the routine 100 is executed as described above, and at step 105, responses of the base unit 10 and the portable units 30 are checked. Since this case is a case where the base unit 10 responded, this is judged at step 105, and the processing proceeds from step 105 to step 106, and at this step 106, it is judged whether the telephone having responded is the base unit 10 or the portable unit 30.

In this case, since the base unit 10 responded, the processing proceeds from step 106 to step 121, and at this step 121, the off-hook processing at the incoming call is executed, so that ringing of the ringer 26 is switched off, and the line L is connected to the handset 13 through the talking circuit 11 and the switching circuit 12. Thus, subsequently, talking with the counter party giving the incoming call becomes possible through the handset 13.

Figure 7B:
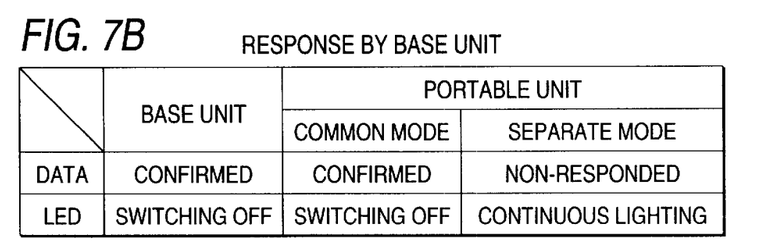

Moreover, the processing proceeds to step 122, and at this step 122, the data of the counter party's telephone number stored in the memory 22 at step 102 are classified into confirmed data as shown in FIG. 7B, and the LED 27 is switched off. All the portable units 30 are notified that the base unit 10 responded to the incoming call. Thereafter, at step 123, this routine 100 is ended.

In this way, in the case where the base unit 10 responded to the incoming call, talking becomes possible in the base unit 10.

On the other hand, when the portable units 30 are notified of the incoming call at step 104, as described above, in all the portable units 30, the responses of the base unit 10 and the units themselves are checked at step 204. In this case, since the base unit 10 responded, and all the portable units 30 are notified of this at step 122, the processing proceeds from step 204 to step 205. Then, at this step 205, it is judged whether the telephone having responded is the base unit 10 or the portable unit 30.

In this case, since the base unit 10 responded, the processing proceeds from step 205 to step 221, and at this step 221, ringing of the ringer 46 is switched off, and next, at step 222, the operation mode to which the unit itself is set is judged.

Among the portable units 30, in the portable unit which is set to the common mode, the processing proceeds from step 222 to step 223, and at this step 223, the data of the counter party's telephone number stored in the memory 42 at step 202 are classified into confirmed data as shown in FIG. 7B, and the LED 47 is switched off, and then, at step 225, this routine 200 is ended.

When the step 222 is executed, in the portable unit which is set to the separate mode, the processing proceeds from step 222 to step 224, and at this step 224, the data of the counter party's telephone number stored in the memory 42 at step 202 are classified into non-responded data as shown in FIG. 7B, and the LED 47 is brought into continuous lighting. Thereafter, at step 225, this routine 200 is ended.

In this way, in the case where the base unit 10 responded to the incoming call, as shown in FIG. 7B, the LED 27 of the base unit 10 and the LED 47 of the portable unit 30 which is set to the common mode are switched off, and the LED 47 of the portable unit 30 which is set to the separate mode is brought into continuous lighting.

[In the case where any one of the portable units 30A to 30C responded to an incoming call]

When an incoming call occurs, the routines 100 and 200 are executed as described above. Since this case is a case where any one of the portable units 30A to 30C responded, at step 106 of the routine 100, it is judged whether the telephone having responded is the base unit 10 or the portable unit 30.

In this case, since any one of the portable units 30A to 30C responded, the processing proceeds from step 106 to step 131, and at this step 131, the line L is connected to the transmitting/receiving circuit 14 through the talking circuit 11 and the switching circuit 12, and the transmitting/receiving circuit 14 is connected to the portable unit having responded among the portable units 30, and next, at step 132, the off-hook processing at the incoming call is executed, and ringing of the ringer 26 is switched off. Thus, subsequently, the connected portable unit can make talking with the counter party giving the incoming call.

Figure 7C:
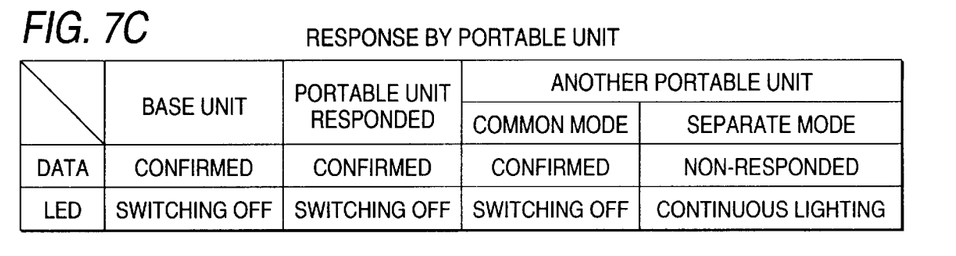

Subsequently, the processing proceeds to step 133, and at this step 133, the data of the counter party's telephone number stored in the memory 22 at step 102 are classified into confirmed data as shown in FIG. 7C, and the LED 27 is switched off. Moreover, the remaining portable units among the portable units 30 are notified that a response was made to this incoming call. Thereafter, at step 134, this routine 100 is ended.

On the other hand, when the portable units are notified of the incoming call at step 104, and any one of the portable units 30A to 30C responded, as described above, at step 205, it is judged whether the telephone having responded is the base unit 10 or the portable unit 30. In this case, since any one of the portable units 30 responded, the processing proceeds from step 205 to step 231, and at this step 231, ringing of the ringer 46 is switched off.

Subsequently, the processing proceeds to step 232, and it is judged whether the unit itself responded to the incoming call. In the case of the unit itself, the processing proceeds from step 232 to step 233, and at this step 233, the processing paired with the processing of the step 132 is executed and the unit is connected to the base unit 10. Thus, subsequently, the portable unit having responded becomes possible to make talking with the counter party giving the incoming call.

Thereafter, the processing proceeds to step 234, and the data of the counter party's telephone number stored in the memory 42 at step 202 are classified into confirmed data as shown in FIG. 7C, and the LED 47 is switched off. Thereafter, at step 235, this routine 200 is ended.

Moreover, at step 232, in the case where the telephone having responded to the incoming call is not the unit itself, the processing proceeds from step 232 to step 241, and at this step 241, the operation mode to which the unit itself is set is judged. When it is set to the common mode, the processing proceeds from step 241 to step 234, the data of the counter party's telephone number stored in the memory 42 at step 202 are classified into confirmed data as shown in FIG. 7C, and the LED 47 is switched off, and then, at step 235, this routine 200 is ended.

At step 241, when the unit itself is set to the separate mode, the processing proceeds from step 241 to step 242, and the data of the counter party's telephone number stored in the memory 42 at step 202 are classified into non-responded data as shown in FIG. 7C, and the LED 47 is brought into continuous lighting. Thereafter, at step 243, this routine 200 is ended.

In this way, in the case where the portable unit 30 responded to the incoming call, as shown in FIG. 7C, the LED 27 of the base unit 10 and the LED 47 of the portable unit 30 which is set to the common mode are switched off, and the LED 47 of the portable unit 30 which is set to the separate mode is brought into continuous lighting.

[In the case where the operation of confirmation is carried out by the base unit 10 after the end of calling]

When any of the base unit 10 and the portable units 30 did not respond to the incoming call, as shown in FIG. 7A, the LEDs 27 and 47 come to blink.

Figure 5:
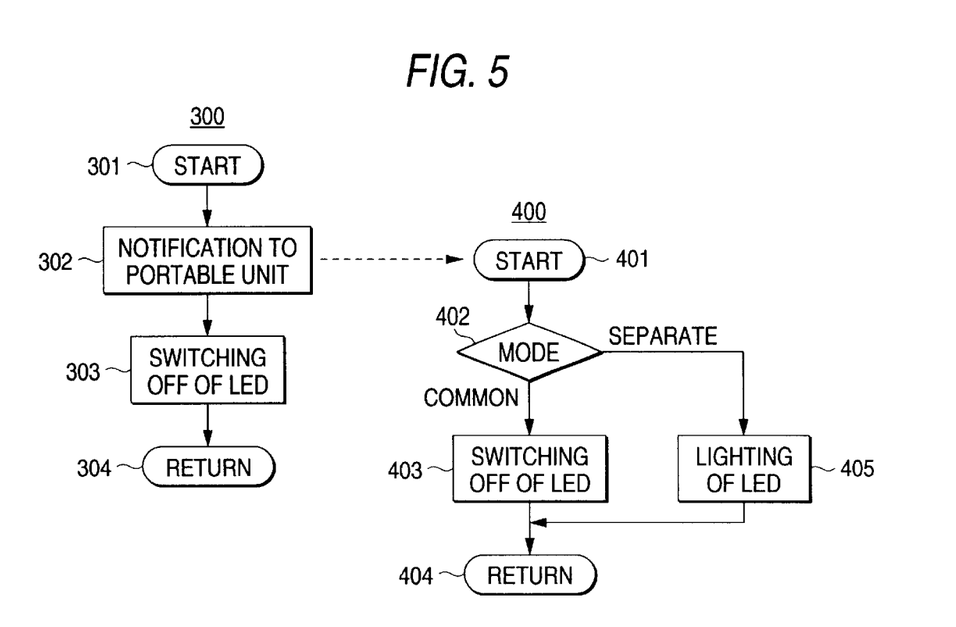
FIG. 5 is a flowchart showing the embodiment of the invention.

Then, if the operation of confirmation is carried out in the base unit 10, the processing of the microcomputer 21 starts from step 301 of the routine 300 in the base unit 10, and next, at step 302, all the portable units 30 are notified that the operation of confirmation has been carried out in the base unit 10. Subsequently, at step 303, the data of the counter party's telephone number stored in the memory 22 at step 102 are classified into confirmed data as shown in FIG. 7D, and the LED 27 is switched off, and then, at step 304, this routine 300 is ended.

When notification to the portable units 30 is executed at step 302, in all the portable units 30, the processing of the microcomputer 41 starts from step 401 of the routine 400, and next, at step 402, the operation mode of the unit itself is judged.

Figure 7D:
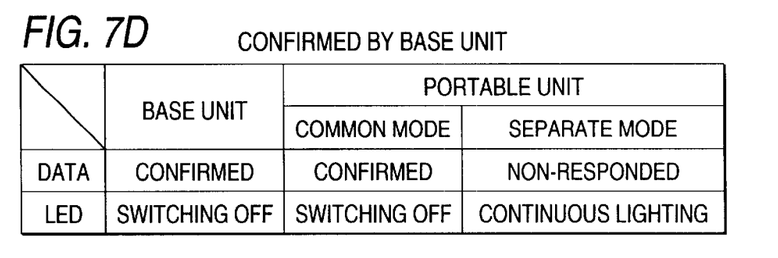

When the common mode is set, the processing proceeds from step 402 to step 403, and at this step 403, the data of the counter party's telephone number stored in the memory 42 at step 202 are classified into confirmed data as shown in FIG. 7D, and the LED 47 is switched off, and then, at step 404, this routine 400 is ended.

Moreover, at step 402, when the separate mode is set, the processing proceeds from step 402 to step 405, and at this step 405, the data of the counter party's telephone number stored in the memory 42 at step 202 are classified into non-responded data as shown in FIG. 7D, and the LED 47 is brought into continuous lighting, and then, at step 404, this routine 400 is ended.

In this way, in the base unit 10, in the case where the operation of confirmation is executed after the end of calling, as shown in FIG. 7D, the LED 27 of the base unit 10 and the LED 47 of the portable unit 30 which is set to the common mode are switched off, and the LED 47 of the portable unit 30 which is set to the separate mode is brought into continuous lighting.

[In the case where the operation of confirmation is carried out by the portable unit 30 after the end of calling]

Figure 6:
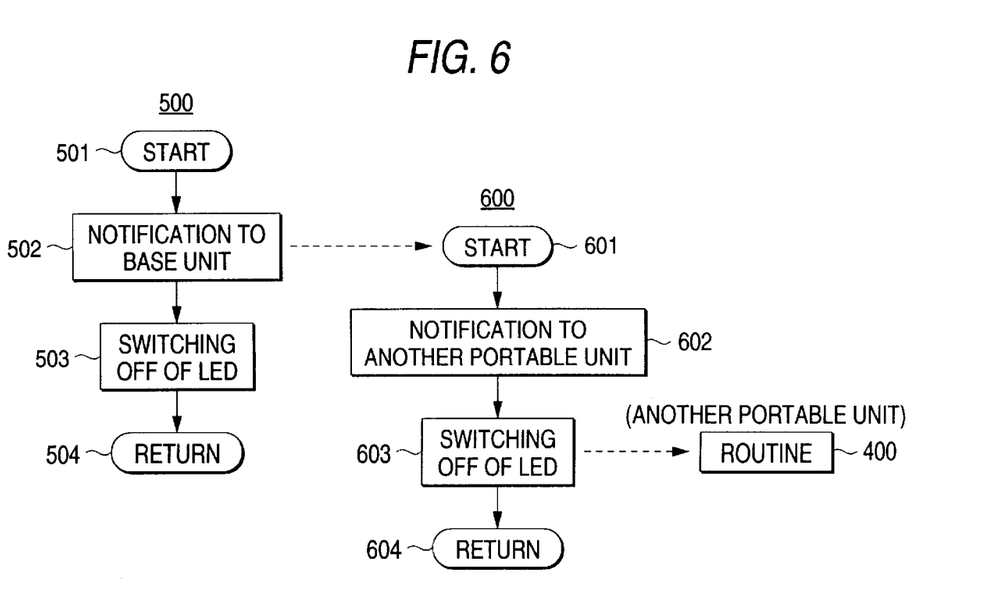
FIG. 6 is a flowchart showing the embodiment of the invention.

When the operation of confirmation is carried out in any one of the portable units 30A to 30C, in the portable unit in which the operation of confirmation was carried out, the processing of the microcomputer 41 starts from step 501 of the routine 500, and next, at step 502, the base unit 10 is notified that the operation of confirmation was carried out in the unit itself. Subsequently, at step 503, the data of the counter party's telephone number stored in the memory 42 at step 202 are classified into confirmed data as shown in FIG. 7E, and the LED 47 is switched off, and then, at step 504, this routine 500 is ended.

When notification to the base unit 10 is executed at step 502, in the base unit 10, the processing of the microcomputer 21 starts from step 601 of the routine 600, and next, at step 602, the remaining portable units are notified that the operation of confirmation was carried out in the portable unit. Subsequently, at step 603, the data of the counter party's telephone number stored in the memory 22 at step 102 are classified into confirmed data as shown in FIG. 7E, and the LED 27 is switched off, and then, at step 604, this routine 600 is ended.

Moreover, when notification to the remaining portable units is executed at step 602, in the remaining portable units, the routine 400 is executed by the microcomputer 41. Thus, in the remaining portable units, the data of the counter party's telephone number stored in the memory 22 at step 102 and the LED 47 are set as shown in FIG. 7E.

Figure 7E:
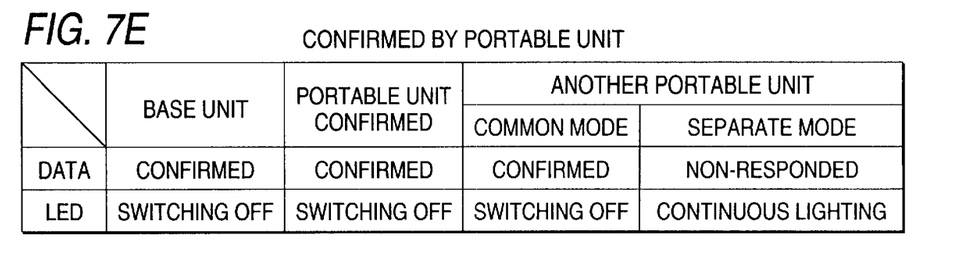

In this way, in the portable units 30, in the case where the operation of confirmation is executed after the end of calling, as shown in FIG. 7E, the LED 27 of the base unit 10, and the LEDs 47 of the portable unit in which the operation of confirmation was carried out and the portable unit which is set to the common mode are switched off, and the LED 47 of the portable unit which is set to the separate mode is brought into continuous lighting.

[Conclusion]

According to the foregoing cordless telephone, with respect to the response and confirmation to the incoming call, since the lighting states of the LEDs 27 and 47 are changed, for example, as shown FIGS. 7A to 7E, from this lighting states, it is possible to know the state of the response to the incoming call or the state of confirmation. Moreover, in that case, in the portable units 30A and 30B which are set to the common mode, if the base unit 10 or any one of the portable units 30 responds or confirms, since the LEDs 27 and 47 are switched off, it is not necessary to go to the place of the telephone in which the response or confirmation was carried out and to erase the display.

Moreover, in the portable unit 30C which is set to the separate mode, even if the base unit 10 or the portable units 30A and 30B make the response or confirmation, since the LED 47 is not switched off, it is convenient for one who uses the portable unit 30C.

As described above, according to the present invention, with respect to the response and confirmation to the incoming call, from the display states of display elements, it is possible to know the response to the incoming call or the state of confirmation. Moreover, in that case, in the portable unit which is set to the common mode, it is not necessary to go to the place of the telephone in which the response or confirmation was carried out and to erase the display. Besides, it is convenient for one who uses the portable unit which is set to the separate mode.

What is claimed is:

1. A cordless telephone system comprising:

a base unit and a plurality of portable units, each of the base unit and plurality of portable units including a display element for displaying a telephone number of a calling party; and control means for controlling the base unit and the plurality of portable units, wherein each of the plurality of portable units is set to one of a first mode and a second mode;

the first mode is a first stored data classification mode;

the second mode is a second stored data classification mode; and the control means performs operations:

in a case where neither of the base unit and the plurality of portable units responded to an incoming call, display states of the display element of the base unit and of the display elements of the plurality of portable units are respectively set to a first display state;

in a case where the base unit responded to the incoming call, display states of the display element of the base unit and of the display element of any portable unit that is set to the first mode are respectively set to a second display state, and a display state of the display element of any of the plurality of portable units that is set to the second mode is set to a third display state; and in a case where one of the plurality of portable units responded to the incoming call, display states of the display element of the base unit, of the display element of the portable unit that responded to the incoming call, and of the display element of any portable unit that is set to the first mode are respectively set to the second display state, and a display state of the display element of any portable unit that is set to the second mode is set to the third display state.

2. The cordless telephone according to claim 1, wherein the control means performs operations:

in the case where neither of the base unit and the plurality of portable units responded to the incoming call, and when an operation of confirmation of the incoming call is performed in the base unit, the display states of the display element of the base unit and the display element of any of the plurality of portable units that is set to the first mode are respectively set to the second display state, and the display state of the display element of any of the portable units that is set to the second mode is set to the third display state; and in the case where neither of the base unit and the plurality of portable units responded to the incoming call and an operation of confirmation of the incoming call is performed in one of the plurality of portable units, the display states of the display element of the base unit, of the display element of the portable unit that responded to the incoming call, and of the display element of any portable unit that is set to the first mode are respectively set to the second display state, and the display state of the display element of any portable unit that is set to the second mode is set to the third display state.

3. A display method for a cordless telephone system having a base unit, a plurality of portable units each of which is set to one of a first mode and a second mode, the first mode being a first stored data classification mode and the second mode being a second stored data classification mode, the base unit and the plurality of portable units each including a display element for displaying a telephone number of a calling party, and a controller for controlling the base unit and the plurality of portable units, the method comprising the steps of:

in a case where neither of the base unit and the plurality of portable units responded to an incoming call, setting display states of the display element of the base unit and of the display elements of the portable units, respectively, to a first display state;

in a case where the base unit responded to the incoming call, setting display states of the display element of the base unit and of the display element of any of the plurality of portable units that is set to the first mode, respectively, to a second display state, and setting a display state of the display element of any of the plurality of portable units that is set to the second mode to a third display state; and in a case where one of the plurality of portable units responded to the incoming call, setting display states of the display element of the base unit, of the display element of the portable unit that responded to the incoming call, and of the display element of any portable unit that is set to the first mode, respectively, to the second display state, and setting a display state of the display element of any portable unit that is set to the second mode to the third display state.

4. The display method for a cordless telephone system according to claim 3, further comprising the steps of:

in the case where neither of the base unit and the plurality of portable units responded to the incoming call and an operation of confirmation of the incoming call is performed in the base unit, setting the display states of the display element of the base unit and the display element of any of the portable units that is set to the first mode, respectively, to the second display state, and setting the display state of the display element of any portable unit that is set to the second mode to the third display state; and in the case where neither of the base unit and the plurality of portable units responded to the incoming call and an operation of confirmation of the incoming call is performed in one of the plurality of portable units, setting the display states of the display element of the base unit, of the display element of the portable unit that responded to the incoming call, and of the display element of any portable unit that is set to the first mode, respectively, to the second display state, and setting the display state of the display element of any portable unit that is set to the second mode to the third display state.

* * * * *

UNITED STATES PATENT AND TRADEMARK OFFICE
CERTIFICATE OF CORRECTION

PATENT NO. : 6,606,507 B2
DATED : August 12, 2003
INVENTOR(S) : John R. Bugarin and James F. Mackin, III It is certified that error appears in the above-identified patent and that said Letters Patent is hereby corrected as shown below:

Column 2,
Line 14, replace "connection. The user may then orders a flowmeter that fits" with -- connection. The user may then order a flowmeter that fits the --
Lines 18-26, replace "In accordance with this invention, a server computer stores nd executes software that provides the remote sizing and ordering system of this invention. The server connects to a remote or client computer used by a user. The input flow stream parameters are used by the server to determine flowmeter parameters . The flowmeter parameters are used by the server to determine whether at least ne model of flowmeter suitable for the flowmeter parameters." with -- In accordance with this invention, a method is provided for remote ordering and configuring of a flowmeter. For the method server receives software that provides the remote sizing and ordering system of this invention. The server connects to a remote or client computer used by a user. The input flow stream parameters are used by the server to determine flowmeter parameters . The flowmeter parameters are used by the server to determine whether at least one model of flowmeter suitable for the flowmeter parameters computer. --
Lines 27-32, delete the paragrah Signed and Sealed this Third Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,606,507 B1 Page 1 of 1
DATED : August 12, 2003
INVENTOR(S) : Toshihiro Fujita It is certified that error appears in the above-identified patent and that said Letters Patent is hereby corrected as shown below:

This certificate supersedes Certificate of Correction issued August 3, 2004, the number was erroneously mentioned and should be vacated since no Certificate of Correction was granted.

Signed and Sealed this

Nineteenth Day of October, 2004

JON W. DUDAS
*Director of the United States Patent and Trademark Office*